United States Patent Office 3,252,878
Patented May 24, 1966

3,252,878
ELECTROLYTIC PRODUCTION OF CARBOXYLIC ACIDS FROM AROMATIC HYDROCARBONS
Brian E. Conway, Ottawa, Ontario, Canada, and Junior W. Loveland, Swarthmore, and William C. Neikam, Linwood, Pa., assignors to Sun Oil Company, Philadelphia, Pa., a corporation of New Jersey
No Drawing. Filed Mar. 29, 1963, Ser. No. 269,192
9 Claims. (Cl. 204—78)

This invention provides a method for preparing carboxylic acids from certain types of aromatic hydrocarbons. The method of the invention involves anodic oxidation, i.e., electrolysis, of the aromatic hydrocarbon to produce a free radical which subsequently reacts in situ with carbon monoxide to produce a carbonyl cation. The latter subsequently reacts in situ with hydroxyl ion to produce carboxylic acid. By way of example 9,10-dihydroanthracene-9,10-dicarboxylic acid can be prepared from anthracene. Likewise, 1,4-dihydronaphthalene-1,4-dicarboxylic acid can be prepared according to the invention from naphthalene. Such dihydrodicarboxylic acids are useful as starting materials in the preparation of polyester type resins. For example, 1,4-dihydronaphthalene-1,4-dicarboxylic acid can be dehydrogenated to the corresponding naphthalene dicarboxylic acid which latter compound in the form of its potassium salt can then be isomerized to 2,6-naphthalene dicarboxylate. The 2,6-naphthalene dicarboxylate can then be converted to 2,6-naphthalene dicarboxylic acid. These reactions are described in, for example, copending application Serial No. 228,259, filed October 4, 1962. Polyester resins can be prepared from 2,6-naphthalene dicarboxylic acid by well known procedures.

Carboxylic acids are obtained from an aromatic hydrocarbon of the types hereinafter specified by electrolyzing the aromatic hydrocarbon at the anode of an electrolytic cell and at a potential greater than its half-wave potential, i.e., by anodic oxidation, in the presence of (1) an electrolyte, (2) a solvent, and (3) CO, and by reacting in situ the carbonyl cation thereby formed with hydroxyl ion. The half-wave potential is a property which is determined polarographically according to the procedure described, for example, in Milner, The Principles and Applications of Polarography, pp. 1–6 (1957), and Kirk and Othmer, Encyclopedia of Chemical Technology, vol. 10, pp. 886–890 (1947). It is the potential of the inflection point of a current-potential diagram obtained under the described conditions. It is a measure of the potential at which electrolytic reaction takes place in the material in question. The electrolytic reaction which occurs at the anode is one of oxidation and the potential required to effect same is generally positive. The electrolytic reaction which occurs at the cathode is one of reduction and the potential required to effect same is generally negative. All half-wave potentials referred to herein are anodic half-wave potentials and are, in addition, all expressed as potentials relative to a calomel reference electrode. Considerable information concerning half-wave potentials of various hydrocarbons is contained in Analytical Chemistry, vol. 33, No. 9, pp. 1196–1201, August 1961. The potentials listed therein are versus a silver-silver chloride reference electrode but, also as stated therein, they can be converted to potentials relative to a calomel electrode by subtracting 0.3 volt from the potentials listed.

The products obtained according to the invention may be monocarboxylic acids or dicarboxylic acids. Typical reactions which occur in the method of the invention are as follows, using naphthalene as an example of the starting material:

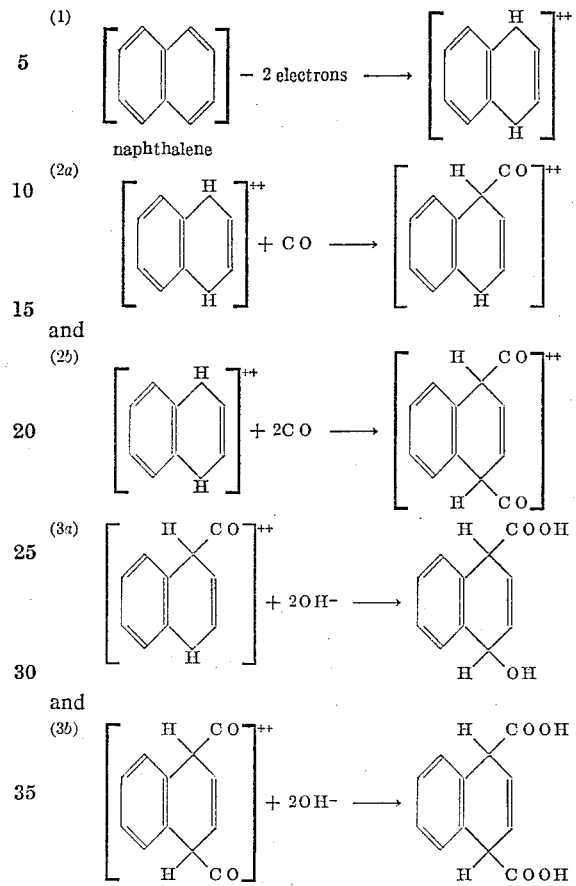

The aromatic compounds which can be converted to carboxylic acids by the method of the invention have certain characteristics. As stated, they are aromatics, i.e., they contain 1 or more aryl nuclei, and they are hydrocarbons. In addition, the aromatic hydrocarbons suitable for the present purpose are further characterized in that they contain an aromatic ring which has at least two hydrogen atoms attached to nuclear carbon atoms. Examples of aromatic hydrocarbons which meet this latter criteria are benzene, xylene, naphthalene, anthracene, etc. A compound such as octamethylnaphthalene does not meet this requirement because it has no hydrogen atoms attached to nuclear atoms of an aromatic ring. A compound such as 1,2,3,6,7,8-hexamethylnaphthalene is unsuitable because although it has two hydrogen atoms attached to nuclear carbon atoms of aromatic rings, there are not two such hydrogen atoms on the same aromatic ring.

The anodic oxidation of the invention is carried out in the presence of an electrolyte. This is necessary since the aromatic hydrocarbon starting materials are not themselves conductive. In addition, the electrolyte should have a higher half-wave potential than the half-wave potential of the aromatic hydrocarbon starting material in order to avoid oxidation of the electrolyte in preference to oxidation of the aromatic hydrocarbon. The aromatic hydrocarbon starting materials of the invention generally have half-wave potentials between approximately +0.0 and +1.8 volts. The electrolyte should have a higher oxidation potential: its half-wave potential should be a larger positive voltage, that is more positive, than that of the aromatic hydrocarbon. For example, a satisfactory electrolyte for use with naphthalene, which has a half-wave potential of +1.3 volts is lithium perchlorate which has a half-wave potential of approximately +1.9 volts. Another suitable electrolyte would be tetrabutyl ammonium fluoride which has a half-wave potential of approximately +2.0 volts. The half-wave potentials of various electrolytes are readily determinable by known procedure and the criteria for selection of an electrolyte are therefore available to a person skilled in the art. Electrolytes which will be suitable for use in most cases include alkali metal perchlorates, fluorides, and sulfates, and tetrabutyl ammonium fluorides and perchlorates. These electrolytes have half-wave potentials in the range of +1.8 to +2.5 volts. The aromatic hydrocarbon starting materials generally have half-wave potentials between +0.0 and +1.8 volts. Other electrolytes than those mentioned which have a suitable half-wave potential can also be used.

The anodic oxidation according to the invention is also carried out in the presence of a mutual solvent for both the aromatic hydrocarbon and the electrolyte. The use of the solvent is necessary since the aromatic hydrocarbon starting materials are generally insoluble in suitable electrolytes. The solvent should have a decomposition potential more positive than the half-wave potential of the aromatic hydrocarbon and more positive than the potential employed in the electrolysis, the latter being discussed hereinafter. Decomposition potential is defined in the aforesaid Kirk and Othmer reference and constitutes the potential at which the current begins to turn sharply upward. In the case of a solvent the decomposition potential is more meaningful than is the half-wave potential since the solvent frequently does not exhibit the typical S-shaped curve that admits of the determination of a half-wave potential. Similarly to half-wave potential, the decomposition potential is negative for cathodic decomposition and positive for anodic decomposition. All decomposition potentials referred to herein are for anodic decomposition. The decomposition potential of the solvent should be more positive than the half-wave potential of the aromatic hydrocarbon in order to avoid oxidation of the solvent in preference to oxidation of the aromatic hydrocarbon, and should be more positive than the potential employed in the electrolysis in order to avoid oxidation of the solvent simultaneously with oxidation of the aromatic hydrocarbon and consequent contamination of the carboxylic acid reaction product with additional reaction products.

Similarly to half-wave potential, decomposition potential is a property which is readily determinable by known procedure, and the criteria for selection of a solvent are therefore available to a person skilled in the art. Solvents which will be suitable for use in most cases include dioxane, aqueous dioxane, dimethylformamide, and acetonitrile. These solvents have decomposition potentials higher than +2.0 volts which is higher than the half-wave potential of most aromatic hydrocarbons, most suitable electrolytes, and the potentials which will be employed in most cases. Other solvents having a suitable decomposition potential and the necessary solubility characteristics can also be used.

As described hereinbefore, the electrolysis is also carried out in the presence of carbon monoxide. The CO can be added to the electrolysis medium, that is to the solution of the aromatic hydrocarbon and the electrolyte in the solvent, in any convenient manner, but it is generally most convenient to merely bubble gaseous CO into the electrolysis medium. The amount of CO consumed will vary but will depend primarily upon the rate at which the aromatic hydrocarbon is oxidized.

The electrolysis as described above produces a carbonyl cation which is then converted to carboxylic acid by reaction in situ with hydroxyl ion. See, for example, Equations 3a and 3b hereinbefore. Preferably a source of hydroxyl ion is supplied by adding a small amount of water to the electrolysis medium. The addition of water has a further advantage in some cases in that it also increases the solubility of the electrolyte in the solvent. The use of water per se as a source of hydroxyl ion is not essential, however, for other compounds such as methanol will also provide hydroxyl ion and thus convert the carbonyl cation to carboxylic acid. Preferably, however, the electrolysis medium contains 0.5–25.0 percent water based on the weight of the solvent, the exact amount depending upon the functions the water is to serve. An alternate suitable procedure is to add water or other hydroxyl producing compound to the electrolyzed solution after completion of the electrolysis. In other words, after the solution has been electrolyzed, the potential can be shut off and the carbonyl cation can then be reacted with hydroxyl ion to produce carboxylic acid.

The potential employed should be greater than the half-wave potential of the aromatic hydrocarbon. This requirement is, of course, inherent in the term anodic oxidation. Also, as described hereinbefore, the potential employed should be less positive than the decomposition potential of the solvent. Preferably the potential employed is not greater than the half-wave potential of the electrolyte. Where monocarboxylic acid is desired (see Equations 2a and 3a hereinbefore), the potential is preferably about 0.1 volt more positive than the half-wave potential of the aromatic hydrocarbon. Where dicarboxylic acid is desired (see Equations 2b and 3b hereinbefore), slightly higher potentials should be used. In any event the potential should be greater than the half-wave potential of the aromatic hydrocarbon starting material; otherwise no anodic oxidation will occur.

During the electrolysis the aromatic hydrocarbon must be present at the surface of the anode. This requirement also is, of course, inherent in the term anodic oxidation. Preferably the electrodes are separated by a diaphragm which is permeable to the electrolyte but impermeable to the aromatic hydrocarbon starting material and to the carboxylic acid reaction product in order to prevent migration of the aromatic hydrocarbon or reaction product to the cathode and subsequent reduction at the electrode. Conventional diaphragm materials such as porous asbestos and porous "Alundum" can be used for this purpose.

The temperature of the electrolysis can be room temperature or elevated temperature. Elevated temperatures are desirable in that they reduce the electrical resistance of the electrolysis medium and hence improve the efficiency of the electrolysis, and also in that they increase the solubility of the electrolyte and aromatic hydrocarbon in the solvent. On the other hand, elevated temperatures reduce the amount of CO in the electrolysis medium and hence may reduce the rates of the chemical reactions involved in the invention. Because of these factors it is desirable to use only moderately elevated temperatures. Preferred temperatures are those in the range of 125°–250° F. although higher or lower temperatures can be employed.

Conducting the electrolysis under elevated pressure is not required but is desirable in order to increase the amount of CO in the electrolysis medium. The practical upper limit of pressure depends upon the strength of the equipment used. Generally a pressure of CO in the range of atmospheric to 200 p.s.i.g. should be employed although other pressures can also be used.

A variety of materials can be used as the electrodes. Examples of suitable materials are carbon, gold, platinum, etc. as anode, and zinc, carbon, lead, etc. as the cathode.

The carboxylic acid produced in the electrolysis can be separated from unreacted hydrocarbon, from electrolyte, and from solvent by any suitable procedure. Frequently a mixture of unreacted hydrocarbon, carboxylic acid, and a small amount of electrolyte can be separated from the solvent by fractional crystallization, from which mixture the electrolyte can be separated from unreacted hydrocarbon and carboxylic acid by washing with water. The carboxylic acid can then be separated from unreacted hydrocarbon by a subsequent fractional crystallization or by extraction with aqueous NaOH. Any other suitable procedure can also be employed, thus where the electrolyte is a tetrabutyl ammonium fluoride it can usually be separated by extraction with water after which carboxylic acid and unreacted hydrocarbon are separated from the solvent by fractional crystallization, vacuum distillation of the solvent, extraction, etc.

The following example illustrates the invention more specifically.

A 0.1 molar solution of sodium perchlorate in dimethylformamide, containing 1 percent water based on the amide, is saturated with anthracene. The resulting solution, is placed in an electrolytic cell having a platinum anode and a carbon cathode. The solution is maintained at 150° F. while being electrolyzed at a voltage of 1.6 volts, referred to an auxiliary calomel reference electrode and while bubbling CO into the solution. The electrolysis is continued for 6 hours. The product is a solution of 9,10-dihydroanthracene-9,10-dicarboxylic acid, anthracene and sodium perchlorate in dimethylformamide. Anthracene, the dicarboxylic acid, and a small amount of the sodium perchlorate are separated from the amide by fractional crystallization. The resulting mixture is washed with water to remove the sodium perchlorate and leave a mixture of anthracene and the dicarboxylic acid. The dicarboxylic acid is separated as its disodium salt from the anthracene by extraction with aqueous NaOH. The extract is then acidified with hydrochloric acid to precipitate the dicarboxylic acid which is then separated by filtration.

Generally similar results are obtained with other aromatic hydrocarbons of the type specified herein such as benzene, napthalene, methyl naphthalene, etc. Generally similar results are also obtained when other electrolytes having suitable half-wave potential such as tetrabutyl ammonium fluoride are used, and when other solvents having suitable decomposition potentials, such as 20 percent water in dioxane, are used.

The invention claimed is:

1. Process for preparing carboxylic acid in an electrolytic cell containing an anode and a cathode which comprises electrolyzing an aromatic hydrocarbon which contains an aromatic ring having at least two hydrogen atoms attached to nuclear carbon atoms in the presence of carbon monoxide, in the presence of an electrolyte having a half-wave potential more positive than that of the hydrocarbon, and in the presence of a mutual solvent for the hydrocarbon and the electrolyte, the solvent having a decomposition potential more positive than the half-wave potential of the hydrocarbon, said hydrocarbon being present at the surface of said anode during said electrolyzing, said electrolyzing being at a potential more positive than the half-wave potential of said aromatic hydrocarbon and less positive than the decomposition potential of said solvent, whereby a carbonyl cation is produced, and reacting said carbonyl cation in situ with hydroxyl ion to form a carboxylic acid.

2. Process according to claim 1 wherein said aromatic hydrocarbon is anthracene.

3. Process according to claim 1 wherein said electrolyte is an alkali metal perchlorate.

4. Process according to claim 1 wherein said electrolyte is tetrabutyl ammonium fluoride.

5. Process according to claim 1 wherein said solvent is acetonitrile.

6. Process according to claim 1 wherein said solvent is dioxane.

7. Process according to claim 1 wherein said solvent is dimethylformamide.

8. Process according to claim 1 wherein said electrolyzing is carried out in the presence of water.

9. Process according to claim 1 wherein said anode and said cathode are separated by a diaphragm which is permeable to said electrolyte and impermeable to said aromatic hydrocarbon and to said carboxylic acid.

References Cited by the Examiner

UNITED STATES PATENTS 2,612,520  10/1949  Doumani et al. _____ 260—515

FOREIGN PATENTS 307,223  3/1929  Great Britain.

JOHN H. MACK, *Primary Examiner.*